United States Patent Office 3,584,043
Patented June 8, 1971

3,584,043
PROCESS FOR THE PREPARATION OF
DIORGANOHALOPHOSPHINES
Ludwig Maier, Zurich, Switzerland, assignor to
Monsanto Company, St. Louis, Mo.
No Drawing. Filed May 6, 1964, Ser. No. 365,510
Claims priority, application Switzerland, May 13, 1963,
5,986/63
Int. Cl. C07f 9/52
U.S. Cl. 260—543P                    13 Claims

ABSTRACT OF THE DISCLOSURE

Process for preparing diorganophosphines of the formula $R_2PX$, wherein R is a hydrocarbyl radical selected from the group consisting of alkyl, cycloalkyl, aralkyl, and aryl radicals and X is halogen, comprising reacting an aminodiorganophosphine of the formula $R'_2NPR_2$, wherein R' is a hydrocarbon radical and R is as previously defined, with a phosphorus trihalide.

---

It was known that treatment of phosphorus trichloride ($PCl_3$) with monoalkylaluminum dichlorides ($RAlCl_2$) or trialkylaluminum ($R_3Al$) produces the corresponding alkylphosphine compounds. In spite of the different proportions of the reaction components and degrees of alkylation of the organoaluminum compounds used, mixtures of all 3 of the possible organophosphine compounds, namely alkyldichlorophosphines ($RPCl_2$), dialkylchlorophosphines ($R_2PCl$) and trialkylphosphines ($R_3P$), were obtained together in all cases. For this reason, obviously, dialkylaluminum chlorides ($R_2AlCl$) were not used for this purpose up to now.

According to a literature report (K. Weyer, Dissertation 1956, T. H. Aachen), the best yields (about 84%) of diethylchlorophosphine can allegedly be obtained when phosphorus trichloride and ethylaluminum dichloride ($C_2H_5AlCl_2$) are reacted in a 1:1 molar proportion. As, however, it is to be suspected from the reported B.P. of 110–120°, instead of 128–131°, the end product might have contained a significant amount of ethyldichlorophosphine ($C_2H_5PCl_2$) (B.P. 113°) which would also be expected in the use of excess phosphorus trichloride. Several studies produced, for example, with methylaluminum dichloride ($CH_3AlCl_2$) under the same conditions only about 40% $(CH_3)_2PCl$ in addition to 10% $CH_3PCl_2$.

As a result, however, of the formation of relatively large amounts of aluminum halide, the use of a monoalkyl-aluminum dihalide for the alkylation of phosphorus is uneconomical.

If phosphorus trichloride, for example, is heated with triethylaluminum in the theoretically correct proportion of 2:3 for 17 hours at 200° for the formation of diethylchlorophosphine, the latter is obtained in a yield of only about 35%. The different reactivity of the aluminum compounds, organically substituted in various degrees, is to be attributed to the varying strengths of complex formation by the phosphorus compounds with the aluminum halides.

According to another literature report (Nachr. Akad. Wiss. UdSSr, Abt. chem. Wiss. 1958 pp. 1006 to 1008, referred to in Chemisches Zentralblatt 1959, p. 15650 and in Chemical Abstracts 53, 1122f (1959)) several monoalkyldichlorophosphines (except the methyl derivative) could be obtained by treatment of phosphorus trichloride with the ether or pyridine adduct of a trialkylaluminum compound, while the corresponding dialkylchlorophosphines could be isolated in the form of dialkylphosphinic acids $R_2PO_2H$ only after a preceding hydrolysis and oxidation.

A technically useful process has not hitherto existed by which diorganohalophosphines could be obtained exclusively and in relatively good yields from a phosphorus trihalide and an organoaluminum compound, especially from triorganoaluminum compounds.

In the present invention a new method is described for the preparation of diorganohalophosphines of the general formula $R_2PX$ in which R means a hydrocarbon radical attached directly to aluminum as it can quite generally be, and X is a halogen atom, which method depends on the fact that first an aminodihalophosphine ($R'_2NPX_2$) is treated with the organoaluminum compound and thereupon the resulting aminodiorganophosphine ($R'_2NPR_2$) is "comproportionated" with a phosphorus trihalide into the desired diorganohalophosphine. Preferred reactants in the process of the invention are those in which R and R' are alkyl having not more than 8 carbon atoms, and X is the chlorine atom.

The aminodihalophosphines used here correspond to the general formula $R'_2NPX_2$, in which the $R'_2N$ group is a radical of a secondary amine, attached to the P-atom through an N-atom, and X is the same as above. Although the $R'_2N$ group could have been any desired amine such as dimethylamine, diethylamine, methylethylamine, di-n-propylamine, diisopropylamine, di-n-butylamine, diisobutylamine, di-tert-butylamine, propyldodecylamine, didodecylamine, N-methylcyclohexylamine, dicyclohexylamine, ethylaniline, pyrrolidine, piperidine, morpholine, etc., the radicals preferred in the present process are the simplest and cheapest secondary amines, because it is a case herein only of auxiliary substituents, which make the reaction possible according to the invention, but are no longer apparent in the final product. In general, the $R'_2N$ group is the dimethylamine or diethylamine radical. Other amines are then called upon if through them the separation of the reaction product by distillation or crystallization would be made easier. Several of these compounds are known. They are prepared most simply by a one-stage aminolysis of a phosphorus trihalide. However, it is also possible to "comproportionate" a triaminophosphine and a phosphorus trihalide in a mol proportion of 1:2 or, since this reaction occurs with exceptional ease, to use such a mixture directly for the intended reaction.

It has been found that both halogen atoms of such aminodihalophosphines can be exchanged smoothly in the action of an organoaluminum compound for the hydrocarbon radicals, without the amino group being attacked. The course of the reaction, not customary until now, was thus also unexpected, because in a corresponding alkylation by means of a Grignard reagent, the N—P bond is attacked almost as strongly as the P—Cl bond. Correspondingly the yield of desired aminodiorganophosphines never exceeded 48% according to this known process (A. B. Burg and P. J. Slota, Jr., J. Am. Chem. Soc., 1958, p. 1107; U.S. Pat. 2,934,564)

In contrast to the also known alkylation of phosphorus trichloride with organoaluminum compounds, the degree of alkylation of the organoaluminum compound used in the introduction of the desired hydrocarbon radicals into the aminodihalophosphines mentioned and therefore ultimately in the preparation of diorganohalophosphines ($R_2PX$) still plays a role according to the process suggested here only insofar as it defines the proportions of reaction components to be used. A desired triorganoaluminum can be used, therefore, by which the amount of the aluminum halide occurring as an undesired byproduct amounts to only ⅓ compared to that produced in the formerly customary direct conversion of a monoalkylaluminum dihalide with phosphorus trihalide. The organic aluminum compounds used here correspond to the general formula $R_nAlX_{3-n}$ in which R means an alkyl, cycloalkyl or aralkyl groups, or an aryl group, X is a halogen atom and $n$ is a whole number from 1 to 3. As organic substituents it is a case of all hydrocarbon radicals attached to aluminum through a carbon atom, which radicals can be exchanged in reaction with an aminodihalophosphine in comparison with a halogen attached to phosphorus. Examples are methyl, ethyl, n-propyl, isopropyl, n-butyl, isobutyl, tert-butyl, pentyl, hexyl, octyl, 2-ethylhexyl, 2,4,4-trimethylpentyl decyl, dodecyl, hexadecyl, octadecyl, cyclobutyl, cyclopentyl, cyclohexyl, cyclooctyl, benzyl, phenylethyl, phenyl, tolyl, xylyl, naphthyl etc.

It is clear that for the present process such organic aluminum compounds are of special practical interest as can be prepared not only by the round-about way of the Grignard compounds, but also by a direct synthesis, e.g. from olefins, hydrogen and aluminum (in the presence of a catalytic amount of pre-formed trialkyl-aluminum). Trimethyl- and triethylaluminum can also be obtained by dehalogenation of the corresponding dialkyl halides by means of sodium, by distillation of the complex compounds formed from dimethyl- or diethyl-aluminum chloride and sodium chloride or from dimethyl- or diethylaluminum fluoride and sodium fluoride. Triethylaluminum is further obtainable from diethylaluminum chloride by the action of sodium hydride and ethylene. As a representative of an unsaturated reaction component, tributenylaluminum, for example has been described in the literature. A further advantage of this process is the fact that organic mono- and di-substituted aluminum halides or mixtures thereof are also usable. The simplest representatives of these classes, namely methyl- and ethylaluminum halides, can be obtained from the corresponding alkyl halides and aluminum or their alloys with magnesium or copper. Methylaluminum dichloride is also suitably obtained from dimethyl ether, aluminum chloride and aluminum. Arylated aluminum compounds can be prepared by heating aryl halides such as chlorobenzene, bromobenzene, iodobenzene, 1-chloronaphthalene, 2-chloronaphthalene, chlorodiphenyls etc. with finely divided aluminum powder which has been activated with small amounts of a halogen, of a hydrogen halide, of a metal halide or of a non-metal halide. In many cases, the organoaluminum compounds can be directly converted further without isolation.

The possible transformation of the mixtures of mono- and dialkylaluminum halides (sesquihalides) resulting from the industrial process, into uniformly alkylated products by treatment with sodium, trialkylaluminum or aluminum chloride, or by separation after addition of sodium chloride is not necessary, because as has already been mentioned the degree of alkylation of the organic aluminum compound is now without influence on the preparation of diorganohalophosphines.

The reaction of the dimethylaminodichlorophosphine with a butylaluminum compound can, for example, be illustrated as follows:

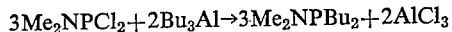

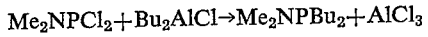

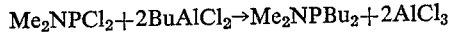

(Me=methyl, Bu=butyl)

In the practical procedure, the components of the reaction are mixed in the required proportion. The reaction takes place quickly and the course is generally exothermic. Solvents such as hexane, inert to the reaction components, can be used. Moisture and oxygen are excluded from the reaction mixture by protective gases such as nitrogen, carbon dioxide (only with organoaluminum halides). After addition of a known complex builder for the aluminum halide, the aminodiorganophosphines formed can be distilled off in most cases.

The intermediate products obtainable according to the new process can also be called phosphinous acid amides instead of aminodiorganophosphines. Several phosphinous acid dimethyl and diethylamides have been known up to now of which the two organic radicals attached to the phosphorus are methyl, trifluoromethyl, methyl and ethyl, ethyl, butyl, phenyl, toluyl, or 1-naphthyl.

It is a further advantage of the new process that the aluminum halide formed additionally can be removed even in the next-to-last reaction stage, thus from aminodiorganophosphine instead of from diorganohalophosphine. On the one hand the complex formed with the aluminum halide is not so stable as in the end product; and, on the other hand, the aminodiorganophosphines are much less sensitive to hydrolysis than the diorganohalophosphines. For that reason the aluminum halide can be precipitated as the hydrate by means of a calculated amount of water in the solvents used, such as e.g. hexane, and then separated by filtering or centrifuging instead of being separated by addition of a complex builder such as alkali chloride, tertiary amine, ether and the like (whereby only the distillation of the end product is made possible). The aluminum halide can be washed only briefly, however, with water or soda solution. In end products very sensitive to moisture, i.e. in the diorganohalophosphines these methods are not suitable for working up the reaction mixture.

It is known from the literature (Burg and Slota, Jr., loc. cit.) to transform aminodioranophosphines by treatment with hydrogen halide according to the equation

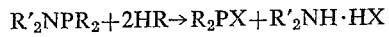

into the corresponding diorganohalophosphines. As is to be seen, an equimolar amount of amine salt is again formed as a by-product which was already the case in the aminolysis of the phosphorus trihalide, i.e. in the preparation of the aminodihalophosphine going before.

It has now been found that one can obtain the corresponding diorganohalophosphines from aminodiorganophosphines in quantitative yield when one "comproportionates" a mixture of equimolecular amounts of phosphorus trihalide and aminodiogranophosphine at room temperature or slightly elevated temperatures. The reaction takes place according to the equation.

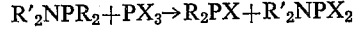

Such a "comproportionating" was unexpected, since phosphinic acid amides ($R_2PO)NR'_2$) are transformed into the corresponding phosphinyl halides ($R_2P(O)X$) by means of a phosphous pentahalide only under defined conditions. However, the phosphorus of the phosphinous acid amides falling under consideration here is transformed into the pentavalent condition by phosphorus pentahalides. Several studies have shown further that the "comproportionating" does not take such a smooth course in a diaminoorganophosphine (($R_2N)_2PR$), but rather all possible products are formed in addition to one another.

As is to be observed from the equation above, no amine salt but rather an aminodihalophosphine is to be reformed as a by-product, with which the reaction was begun, and which can again be introduced into the reaction cycle in the same manner. Both products can easily be separated by distillation; and if necessary, the suitable amine radical is selected. If the reaction cycle is once in motion, the amine salt is no longer formed as an undesirable by-product.

In the practical carrying out of the "comproportionating," equimolecular amounts of both reactants are mixed, whereupon under exclusion of moisture and oxygen, the reaction to be carried out as rule initiates itself. If necessary the mixture can also be heated a little while. When halogen is mentioned in this description, there are to be understood in this connection primarily the technically more important chlorides. However, bromides, iodides, and fluorides can be treated in the same way.

EXAMPLE 1

To 44 g. $(CH_3)_2NPCl_2$ there is slowly added under nitrogen, a solution of 25 g. $Al(C_2H_5)_3$ in 150 ml. hexane. A strongly exothermic reaction sets in, and a precipitate forms. After 1.5 hours heating in a reflux the hexane is distilled off. After addition of 23 g. KCl the residue is distilled under reduced pressure.

Yield 28 g. (69.4%) $(CH_3)_2NP(C_2H_5)_2$. The product purified by repeated distillation has a B.P. of 141–143°/716 mm.: $n_D^{20}$ 1.4550; $d_4^{20}$ 0.8277.

To 6 g. of the dimethylaminodiethylphosphine obtained above are added 6.2 g. $PCl_3$ under nitrogen. A strongly exothermic reaction begins immediately with formation of a homogeneous liquid and a small amount of an orange precipitate. The fractionated distillation results in (1) 5.5 g. (98%) $(C_2H_5)_2PCl$; B.P. 128–131°/714 mm.
(2) 6.3 g. (95.5%) $(CH_3)_2NPCl_2$; B.P. 148–150°/720 mm.

It has been found in other experiments that when, for example an equimolar amount of N-methylanilinophosphine dichloride is used in the process of Example 1 instead of dimethylaminophosphine dichloride, the yield of the intermediate product is very substantially increased and so also the yield of final product. This may be due to steric factors, i.e. the use of a bulkier group, the phenyl group, on the nitrogen.

When in the process of Example 1, instead of aluminum triethyl, an equimolar amount of aluminum trimethyl is used, the resultant product is dimethylphosphine chloride.

What is claimed is:

1. A process for preparing diorganohalophosphines of the formula $R_2PX$ wherein R is a hydrocarbon radical having not more than 18 carbon atoms selected from the group consisting of alkyl, cycloalkyl, aralkyl, and aryl radicals and X is halogen, comprising reacting an aminodiorganophosphine of the formula $R'_2NPR_2$, wherein R is as defined hereinabove and R' is a hydrocarbon radical, with a phosphorus trihalide of the formula $PX_3$ wherein X is as defined hereinabove.

2. A process of claim 1 wherein the reaction is conducted in an inert solvent.

3. A process of claim 1 wherein the reaction is conducted under an inert atmosphere.

4. A process of claim 1 wherein the aminodiorganophosphine is reacted with an equimolar amount of phosphorus trihalide.

5. A process of claim 1 wherein R and R' are alkyl radicals having not more than 8 carbon atoms, and X is chlorine.

6. A process for making diethylchlorophosphine comprising reacting under an inert atmosphere dimethylaminodiethylphosphine with an equimolar amount of trichlorophosphine.

7. A process for preparing diorganohalophosphines of the formula $R_2PX$ wherein R is a hydrocarbon radical having not more than 18 carbon atoms selected from the group consisting of alkyl, cycloalkyl, aralkyl, and aryl radicals and X is halogen, comprising the steps of (i) reacting an aminodihalophosphine of the formula $R'_2NPX_2$, wherein R' is a hydrocarbon radical and X is as defined hereinabove, with an organic aluminum compound of the formula $R_nAlX_{3-n}$ wherein R and X are as defined hereinabove and $n$ is an integer from 1 to 3, to thereby form by-product aluminum halide and as an intermediate product an aminodiorganophosphine of the formula $R'_2NPR_2$ wherein R and R' are as above defined, (ii) separating by-product aluminum halide from the reaction mixture, (iii) reacting said aminodiorganophosphine with phosphorus trihalide of the formula $PX_3$, wherein X is as defined hereinabove, to thereby form a diorganohalophosphine of the formula $R_2PX$ and by-product aminodihalophosphine of the formula $R'_2NPX_2$, where R, R' and X are as previously defined, (iv) recovering said diorganohalophosphine from the reaction mixture, and (v) reacting said by-product aminodihalophosphine with additional organic aluminum compound in accordance with step (i) above.

8. A process of claim 7 wherein step (i) is carried out in an inert solvent.

9. A process of claim 7 wherein steps (i) and (iii) are carried out under an inert atmosphere.

10. A process of claim 7 wherein R and R' are alkyl radicals having not more than 8 carbon atoms, and X is chlorine.

11. A process of claim 7 wherein in step (ii) said aluminum halide is separated from said reaction mixture by addition to said reaction mixture of sufficient water to form a water insoluble hydrate of said aluminum halide, and separating the resulting precipitate of hydrate from the reaction mixture.

12. A process of claim 7 wherein step (iii) said aminodiorganophosphine intermediate product is reacted with an equimolar amount of said phosphorus trihalide.

13. A process of claim 7 wherein dimethylaminodichlorophosphine is reacted under an inert atmosphere and in an inert solvent with an equimolar amount of triethylaluminum to thereby form by-product aluminum chloride and, as an intermediate product, dimethylaminodiethylphosphine, by-product aluminum chloride is separated from the reaction mixture by treating the reaction mixture with a sufficient amount of potassium chloride to form a complex with the aluminum chloride from which said dimethylaminodiethylphosphine intermediate product is separated by distillation, the thus removed dimethylaminodiethylphosphine is reacted under an inert atmosphere with an equimolar amount of phosphorus trichloride, and the resulting diethylchlorophosphine is recovered by distillation.

References Cited

Kosolapoff, Organophosphorus Compounds, pp. 278–298.

LEWIS GOTTS, Primary Examiner

E. J. GLEIMAN, Assistant Examiner

U.S. Cl. X.R.

260—551P